(12) United States Patent
Wessel

(10) Patent No.: US 9,945,545 B2
(45) Date of Patent: Apr. 17, 2018

(54) CLIP

(71) Applicant: Elmer A. Wessel, Lincoln, NE (US)

(72) Inventor: Elmer A. Wessel, Lincoln, NE (US)

(*) Notice: Subject to any disclaimer, the term of this patent is extended or adjusted under 35 U.S.C. 154(b) by 0 days.

(21) Appl. No.: 15/210,758

(22) Filed: Jul. 14, 2016

(65) Prior Publication Data

US 2016/0320034 A1 Nov. 3, 2016

Related U.S. Application Data

(60) Provisional application No. 62/210,851, filed on Aug. 27, 2015.

(51) Int. Cl.
| | | |
|---|---|---|
| *F16L 3/00* | (2006.01) | |
| *F21V 21/088* | (2006.01) | |
| *A47F 5/08* | (2006.01) | |
| *A47B 95/00* | (2006.01) | |
| *F16B 12/32* | (2006.01) | |
| *F21W 131/405* | (2006.01) | |

(52) U.S. Cl.
CPC ............ *F21V 21/088* (2013.01); *A47B 95/00* (2013.01); *A47F 5/0869* (2013.01); *F16B 12/32* (2013.01); *F21W 2131/405* (2013.01)

(58) Field of Classification Search
CPC .. A47F 5/01; A47F 5/13; A47F 5/0018; A47F 5/0031; A47F 5/0838; A47F 5/0056; A47F 5/101; A47F 7/148
USPC .... 248/249, 316.1, 316.7, 316.8, 74.1, 74.2; 211/90.03
See application file for complete search history.

(56) References Cited

U.S. PATENT DOCUMENTS

| | | | | |
|---|---|---|---|---|
| 4,374,498 | A * | 2/1983 | Yellin .................... | A47B 55/02 108/152 |
| 4,606,735 | A * | 8/1986 | Wilder .................. | A61M 25/02 128/DIG. 26 |
| 4,735,325 | A * | 4/1988 | Remmers ............. | A47B 96/068 211/107 |
| 4,795,121 | A * | 1/1989 | Comito ..................... | F21S 4/10 211/26 |
| 6,286,694 | B1 * | 9/2001 | Battaglia ................ | A47B 55/02 108/107 |
| 8,684,319 | B2 * | 4/2014 | Brouwer .............. | H02G 3/0443 248/235 |

* cited by examiner

*Primary Examiner* — Steven M Marsh
(74) *Attorney, Agent, or Firm* — Dobbin IP Law P.C.; Geoffrey E. Dobbin

(57) ABSTRACT

A clip for attaching a device, such as a lighting strip, to an underlying wire structure, such as a merchandizer shelf or peg, may present at least one spring bar as a part of a main clip body. These spring bars should each have a portion thicker than a remainder than the spring bar so as to increase a range of sizes of the device may be accommodated by the clip. The thicker portions should interact with a top surface of the device to force the spring bars to provide a counter pressure to the device and secure it to the structure. Legs depending from the clip body may feature cut-outs to interface securely with the underlying wire structure. Said cut-out may be made to accommodate different sizes of wire.

20 Claims, 7 Drawing Sheets

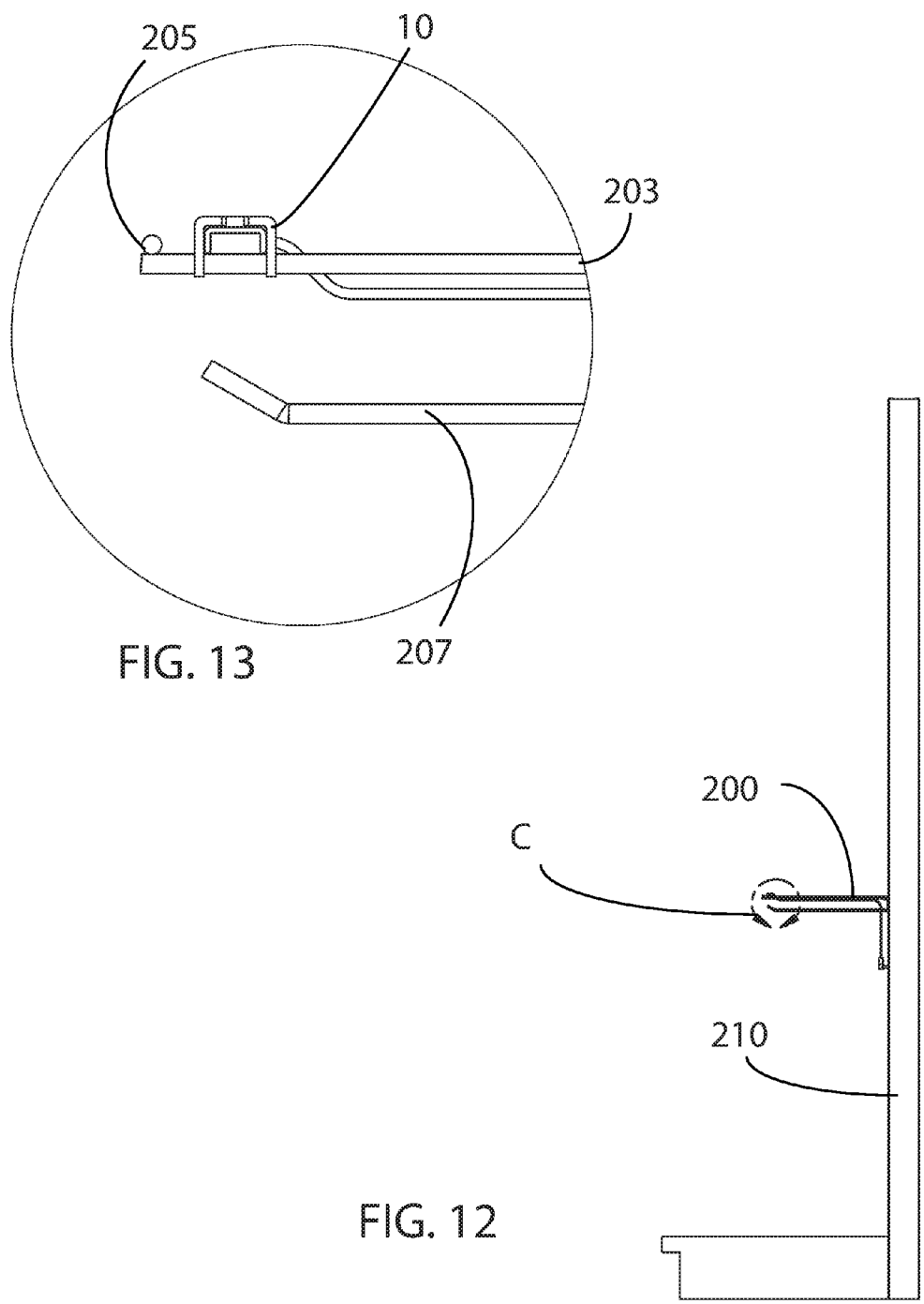

CLIP

CROSS-REFERENCES TO RELATED APPLICATIONS

This Application claims priority as a perfection of prior filed U.S. provisional application No. 62/210,851, filed Aug. 27, 2015, and incorporates the same by reference in its entirety herein.

FIELD OF THE INVENTION

The present invention relates to the field of clips and more particularly relates to a clip for securing an oblong object, such as a light strip, to a wire-based structure.

BACKGROUND OF THE INVENTION

Merchandizing is the art of making product look appealing on a display so as to induce a sale of that product. There are many different strategies for merchandizing which may vary based on the type of product sold. However, there are a few strategies which are near universal in application. One is to illuminate the product on the display. Product illumination not only helps a potential consumer see the product, which is useful in examination and inspection, but light naturally draws visual attention. So if one product is illuminated while a competitor's product is not, the illuminated product will have a better chance of being seen first.

Illumination strategies need lights to be effective. As there are a multitude of merchandizers and displays, there may be a multitude of lights made for such displays. However, the use of lighting strips on wire merchandizer shelves presents a unique problem. Lighting strips may not be uniform and neither may be wires used in shelving. Thermal changes may also affect the dimensions of both lighting strips and shelving wires. Since there is no uniformity, lighting strips may not be securely held in place at a given time, allowing movement. Movement of lighting strips may cause damage to product, the strip, or shelf, allow tampering, and at the very least will affect the display.

The present invention is a clip for affixing a light strip onto a wire-based shelf or rack of a merchandizer or similar structure and provide uniform pressure to the strip in an effort to keep it in place on the merchandizer. It may also be used in any circumstance where a lighting strip or similar structure is desired to be used to illuminate any subject and a suitable mounting structure is provided.

SUMMARY OF THE INVENTION

In view of the foregoing disadvantages inherent in the known types of securement devices, this invention provides an adjustable clip for the securement of a device to an underlying structure. As such, the present invention's general purpose is to provide a new and improved clip that self-adjusts to secure a device to an underlying structure. To accomplish these objectives, the clip may comprise a clip body which may be roughly cubic with two legs extending downwards and which may have structure to attach to a merchandizer wire shelf. The clip may then also comprise at least one spring bar partially attached its main body and each such spring bar having a downward pressure nub. The pressure nub projects downward so that it may interface with a connected device so the spring bar then may apply pressure to the device and clip, keeping them securely connected in relation to each other and the wire shelf.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 12 is a side elevation of a display pegboard, with a light strip installed on adjacent display pegs.

FIG. 13 is a close-up view of one display peg, taken in circle C.

DETAILED DESCRIPTION OF THE PREFERRED EMBODIMENT

With reference now to the drawings, the preferred embodiment of the clip is herein described. It should be noted that the articles "a", "an", and "the", as used in this specification, include plural referents unless the content clearly dictates otherwise.

Figure 6:
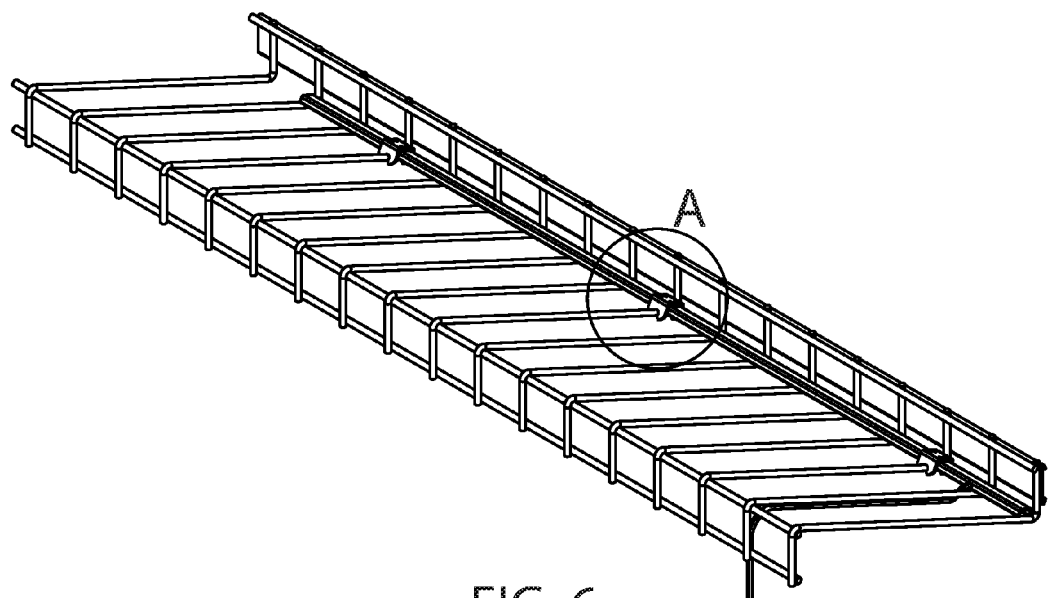
FIG. 6 is a perspective view of three clips of FIG. 1 in use on a wire shelf.
Figure 7:
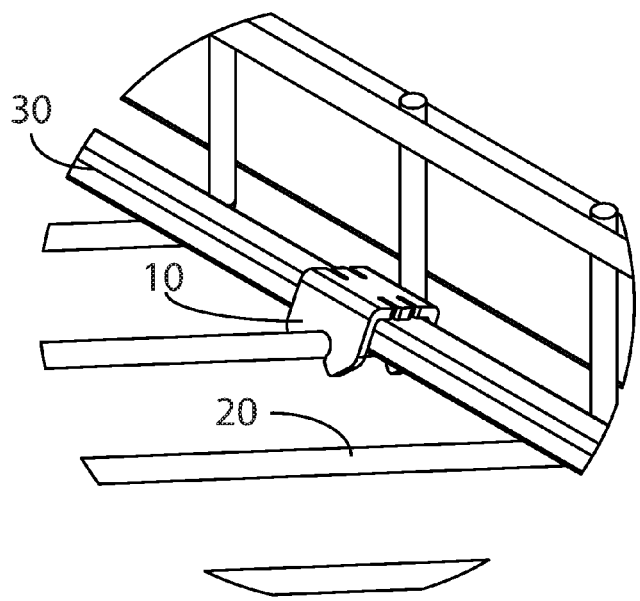
FIG. 7 is a close-up view of one clip in use, taken in circle A of FIG. 6.
Figure 8:
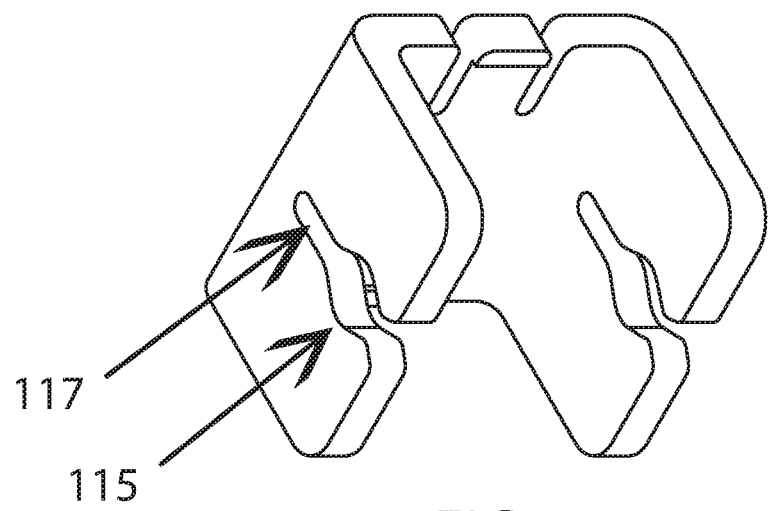
FIG. 8 is a perspective view of an alternate clip embodiment, with a slit extending from the cut-out.

With reference to FIGS. 1-5, a clip 10 may be a simple three-walled construction with a central, planar main body, or base, 100 which is depicted as roughly squared in the Figures, and two opposite walls depending therefrom being defined as legs 110. The legs 110 present a cut-out 115 of appropriate shape to interface with a structure 20 (FIGS. 6 and 7) at their extremity. This cut-out 115 may be shaped and sized for any particular gauge of wire used in a rack. The cut-out 115 may also feature a slit 117 extending upwards on the legs 110 of the clip 10. Such a slit 117 would allow some expansion of the cut-out 115 in order to accommodate larger gauge wires 30 (FIG. 8).

Figure 1:
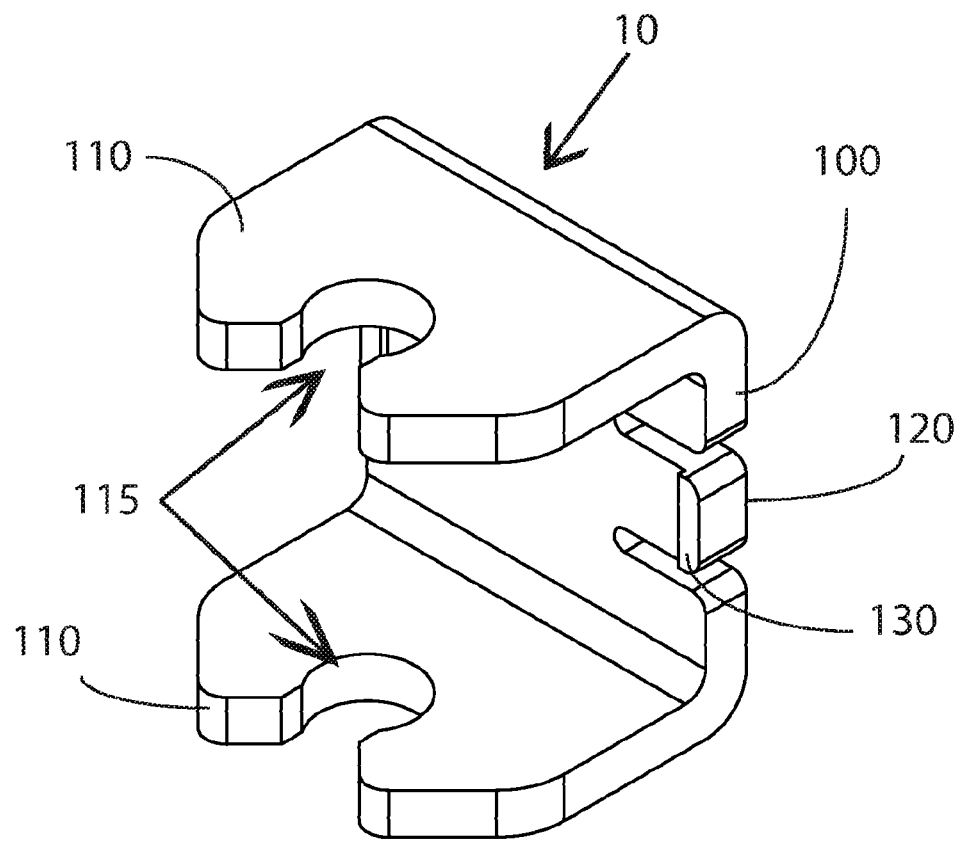
FIG. 1 is a perspective view of one type of clip for use on wire shelving racks.
Figure 2:
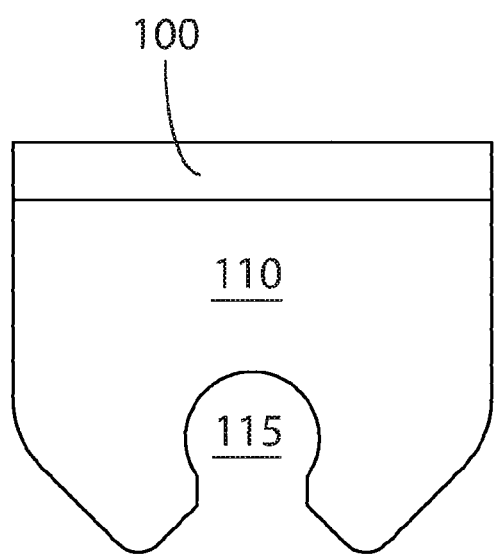
FIG. 2 is a front elevation of the clip of FIG. 1, the rear elevation being identical.
Figure 3:
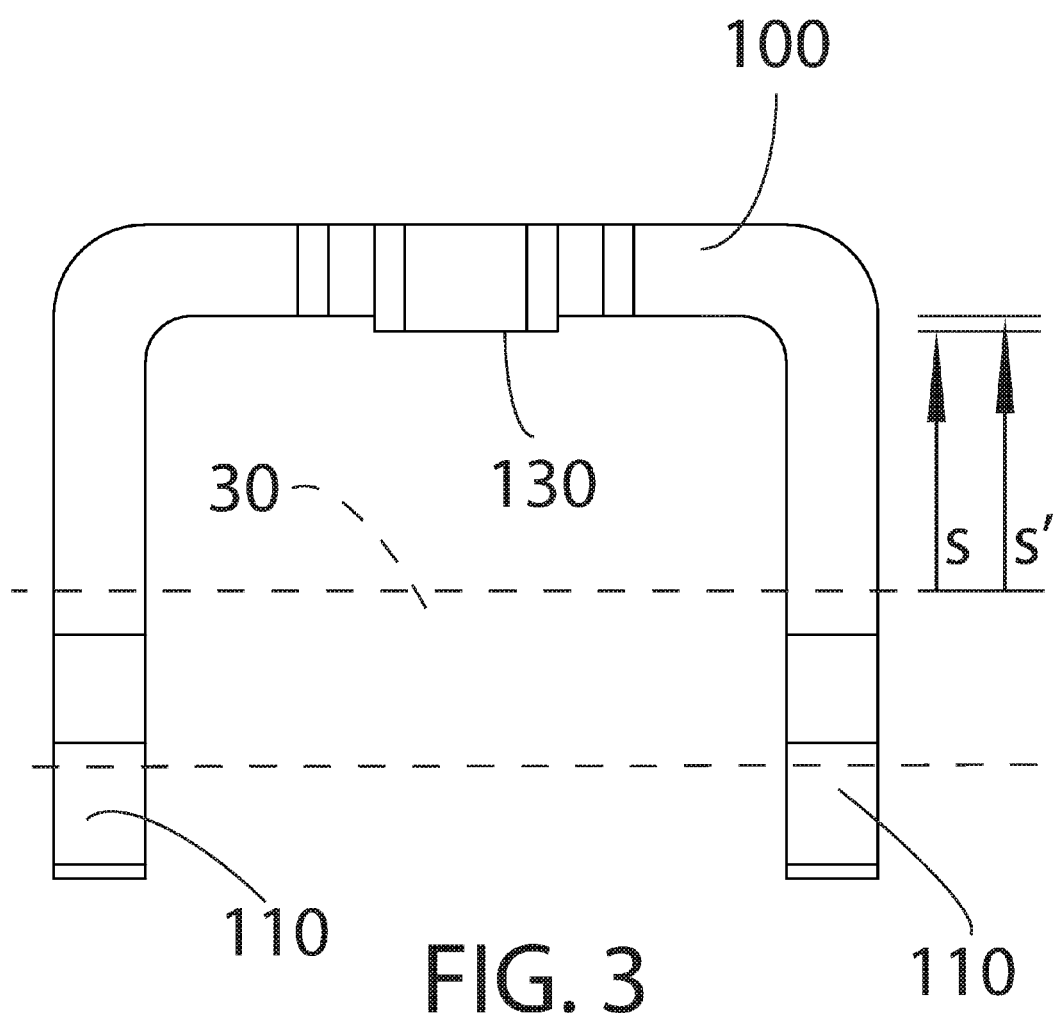
FIG. 3 is a left elevation of the clip of FIG. 1, the right elevation being identical.
Figure 4:
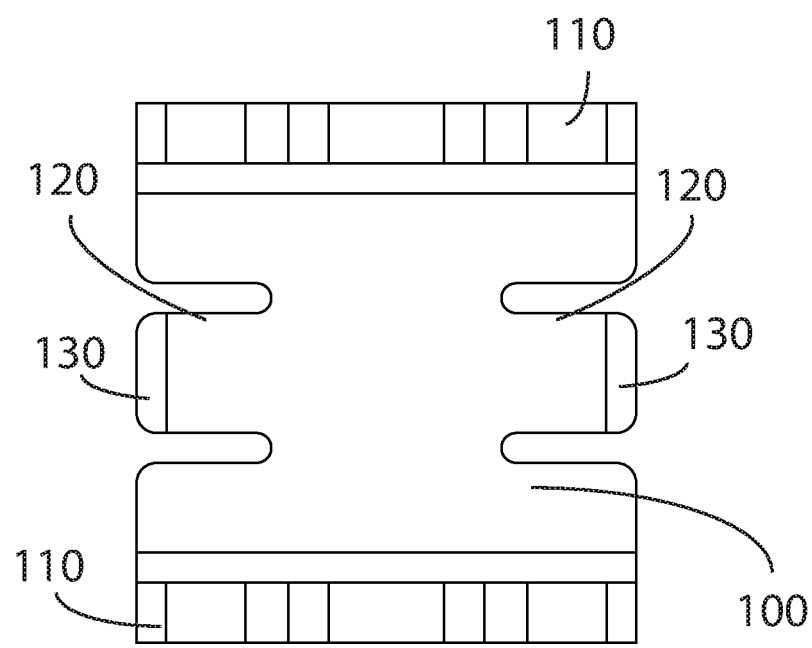
FIG. 4 is a bottom plan view of the clip of FIG. 1.
Figure 5:
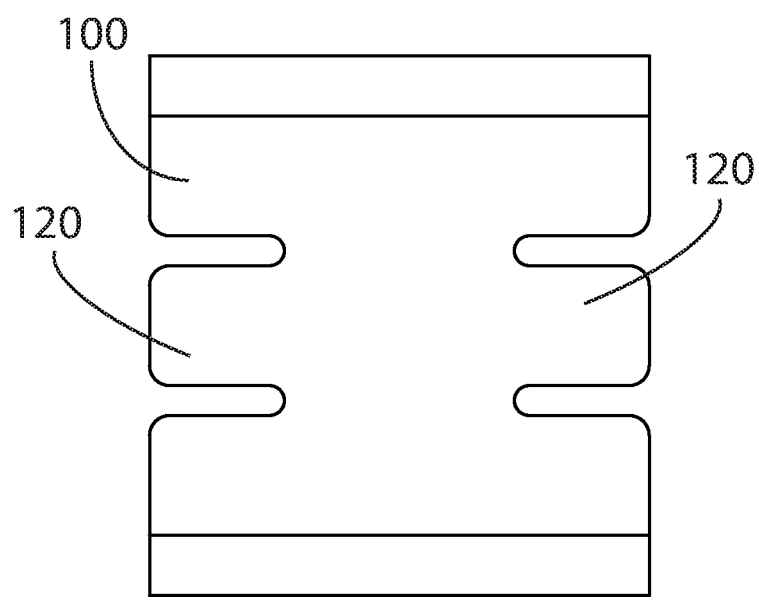
FIG. 5 is a top plan view of the clip of FIG. 1.
Figure 9:
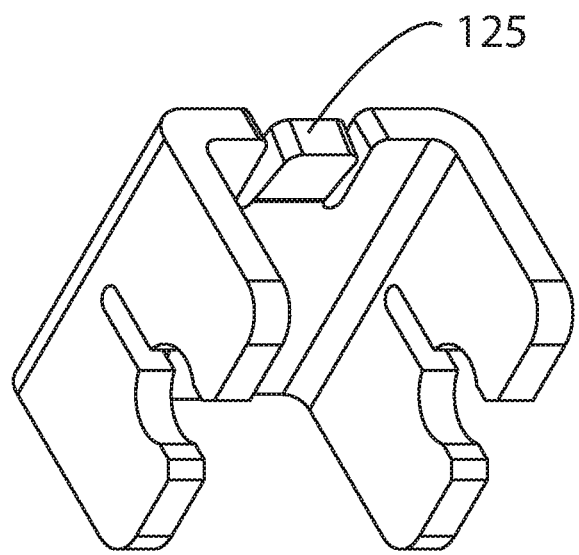
FIG. 9 is a perspective view of an alternate clip embodiment, with a tapered arm.
Figure 11:
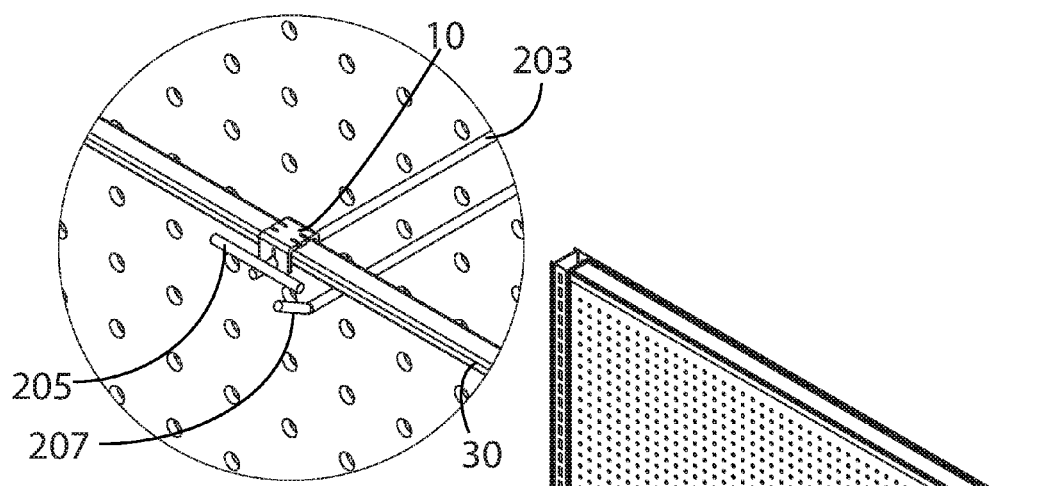
FIG. 11 is a close-up view of one display peg, taken in circle B.
Figure 10:
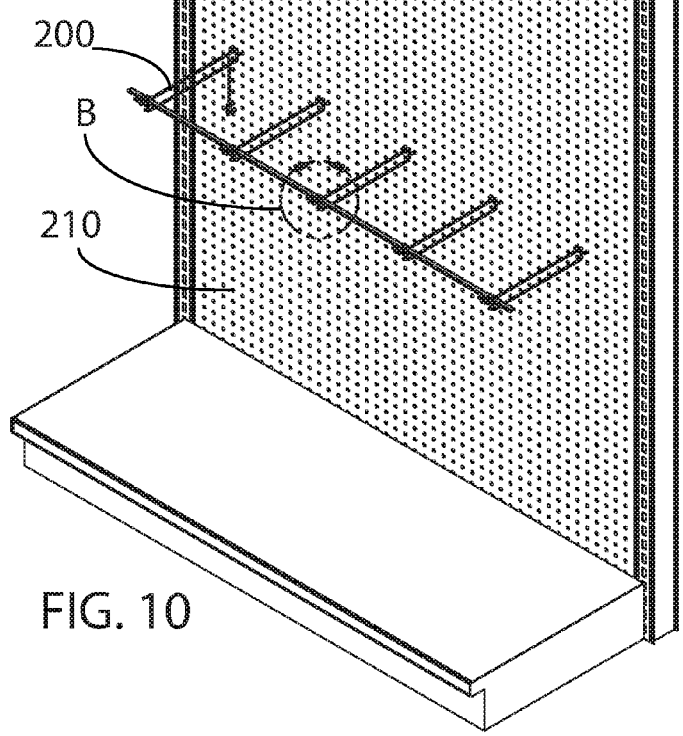
FIG. 10 is a perspective view of a display pegboard, with a light strip installed on adjacent display pegs.

At least one spring bar is required to provide adequate pressure to the structure 20 and keep the clip 10 and associated light strip in place. A spring bar may be any piece of the clip 10 that is at least partially detached from the base 100 in a manner that will allow flexion of the spring bar. The detachment may be as simple as a slit in the base 100, thereby forming a spring bar of each side of the base, or two parallel slits which form a defined spring bar, or three to form a leaf spring bar. The spring bar may also be an arm cantilevered off of an edge of the base 100. In the preferred embodiment, two parallel slits extending from a point in the base 100 to its edge form two opposed spring bars in the form of cantilevered arms 120. Such arms 120 are ideally located on sides of the base 100 from which the legs 110 do not depend, as this removes the need of a third slit. The arms 120 ideally do not extend beyond an edge of the base 100 as this provides some protection to the arms 120 as well as a simple construction of said arms 120. This is not to say that all spring bars are arms as shown and described, as they may take virtually any shape. Ideally, all forms of spring bars should be thicker at a point where minimum displacement of the spring bar applies maximum pressure to the underlying structure. The preferred embodiment has a small spring nub extending downward, towards an interior of the clip 10. The depicted arms 120 are no exception and each have a small, bulbous head 130 at their extremities. Any structure of spring bar which has a thicker portion at a point of maximum counter-pressure will suffice, as is illustrated by the embodiment shown in FIG. 9, where the spring arm 125 tapers from its extremity to is origin on the base. Any spring bar must be somewhat flexible, as depicted in FIG. 3, and sufficient to provide a counter-force when flexed. This counter-force is used to secure an underlying light strip by pressing it against the wire of the rack while the clip 10 is held in place on the wire rack by the cut-outs 115. It should be noted that a spring bar is defined by its function and not its structure. As such, a spring bar may be identified as any feature of a clip 10 which has some partial detachment from the clip 10 that allows flexion of the spring bar relative to the base 100. This may even include opposed sides of the base 100 of the clip (such as would happen with a single slit in the base 100) as the sides would flex relative to each other. Likewise, the thickness of the spring bar may maximized at any location of the spring bar, from an extreme end, as are the heads 130, to an origin of said spring bar on the base 100. This point of maximum thickness would have an ideal location which would maximize the spring pressure on the clip 10 with minimum spring bar displacement (FIG. 3).

In use then, a clip 10 may be used to fasten a lighting strip or other device 30 to a merchandizer structure 20. The bulbous heads 130 will then contact a top surface of the device 30 while the legs 110 interface with the structure 20 using the cut-outs 115. Together, the spring bar and the cut-outs 115 define a variable depth, between s and s', in which a light strip may reside. The cut-outs 115 will secure the clip 10 at a given separation of the base 110 from the structure 20, but variance of the width in the light strip 30 may allow the device to slip underneath the clip 10. The spring bars (in the preferred embodiment, arms 120) prevent this action as their bulbous heads 130 interact with the top surface of the device 30 and cause the spring bar to flex (FIG. 3) and provide counter-pressure and secure the device 30 against the structure 20.

An alternate use of the clips and lighting strips is depicted in FIGS. 10-13. So long as display pegs 200 on a peg board 210 are in line, a light strip 30 may be positioned across said display pegs 200 and the clip 10 may secure the light strip 30 to the top rod 203 of said display pegs 200. When so positioned, the light strip 30 is behind a pricing support 205 and directs light downward to the hanging rod 207, where product is positioned for display. In this manner, targeted light may be used on peg displayed product, a functionality that has not before been seen. It should be noted that the clips 10 may fasten a light strip 30, or any other similar structure, on any type of wire, rod, or peg within the clips physical capabilities. As such, use beyond the field of merchandising is contemplated and should be read into the appended claims. Rods and display pegs and other equivalent structures should also be encompassed in the term "wire" or "wire structure" as they are used in this specification and its appended claims.

Any strong and resilient material may be utilized to manufacture the clips 10. This would include polymers and metals. The cut-outs 115 may be made of any shape to comport with the underlying structure 20, ideally allowing for a snug and secure fit of the clip 10 to the structure 20. As such, the cut-outs 115 depicted, in this case as round, should not be seen limiting to the whole of the invention. Likewise, the sizing of the clip 10 will be dependent upon a number of factors-including the size and shape of the structure, the size and shape of the device, angle of interaction of the device, structure and clip, etc.

Although the present invention has been described with reference to preferred embodiments, numerous modifications and variations can be made and still the result will come within the scope of the invention. No limitation with respect to the specific embodiments disclosed herein is intended or should be inferred.

What is claimed is:

1. A clip for the securement of devices to an underlying wire structure, the clip comprising:
   a. a planar base with a plurality of edges;
   b. two legs depending from edges of the planar base;
   c. each leg further comprising a cut-out at a lowermost end;
   d. at least one spring bar located in the planar base and being at least partially detached therefrom;
   e. at least one nub located on an underside of the spring bar wherein each cut-out is of a shape complimentary to interface with the underlying wire structure.

2. The clip of claim 1, the at least one spring bar being formed by no more than three coordinated slits in the main body per spring bar.

3. The clip of claim 1, the at least one spring bar being two opposed spring arms, each formed by two slits extending from a point on the main body to an edge of the same.

4. The clip of claim 3, the at least one nub on each of the spring arms further comprising one bulbous head located at an extreme edge of said spring arms.

5. The clip of claim 1, the at least one spring bar being cantilevered from the main body.

6. The clip of claim 5, the at least one nub on the at least one spring bar further comprising one bulbous head located at an extreme edge of said spring bar.

7. The clip of claim 1, the at least one nub being located on the at least one spring bar at a location which maximizes spring pressure and minimizes displacement of the spring bar from the planar base.

8. The clip of claim 1, the planar base being rectangular, with legs depending from opposed sides.

9. The clip of claim 8, the at least one spring bar being formed by no more than three coordinated slits in the main body per spring bar.

10. The clip of claim 8, the at least one spring bar being two opposed spring arms, each formed by two slits extending from a point on the main body to an edge of the same.

11. The clip of claim 10, the at least one nub on each of the spring arms further comprising one bulbous head located at an extreme edge of said spring arms.

12. The clip of claim 8, the at least one spring bar being cantilevered from the main body.

13. The clip of claim 12, the at least one nub on the at least one spring bar further comprising one bulbous head located at an extreme edge of said spring bar.

14. The clip of claim 1, each cut-out further comprising a slit extending into a body of each leg in which the cut-out is positioned, the slit providing additional flexibility to the leg so as to allow the cut-out to accommodate different sizes of the underlying wire structure.

15. The clip of claim 14, the at least one spring bar being formed by no more than three coordinated slits in the main body per spring bar.

16. The clip of claim 14, the at least one spring bar being two opposed spring arms, each formed by two slits extending from a point on the main body to an edge of the same.

17. The clip of claim 16, the at least one nub on each of the spring arms further comprising one bulbous head located at an extreme edge of said spring arms.

18. The clip of claim 8, the at least one spring bar being cantilevered from the main body.

19. The clip of claim 18, the at least one nub on the at least one spring bar further comprising one bulbous head located at an extreme edge of said spring bar.

20. The clip of claim 18, the at least one nub being located on the at least one spring bar at a location which maximizes spring pressure and minimizes displacement of the spring bar from the planar based.

* * * * *